(12) United States Patent
Kim et al.

(10) Patent No.: US 10,684,179 B2
(45) Date of Patent: Jun. 16, 2020

(54) VISCO-POROELASTIC ELASTOMER-BASED CAPACITOR TYPE TACTILE SENSOR

(71) Applicants: Foundation of Soongsil University-Industry Cooperation, Seoul (KR); IUCF-HYU (Industry-University Cooperation Foundation Hanyang University), Seoul (KR)

(72) Inventors: Do Hwan Kim, Anyang-si (KR); Joo Sung Kim, Yongin-si (KR); Eun Song Jee, Incheon (KR); Moon Sung Kang, Seoul (KR)

(73) Assignees: FOUNDATION OF SOONGSIL UNIVERSITY-INDUSTRY COOPERATION, Seoul (KR); INDUSTRY-UNIVERSITY COOPERATION FOUNDATION HANYANG UNIVERSITY, Seoul (KR)

(*) Notice: Subject to any disclaimer, the term of this patent is extended or adjusted under 35 U.S.C. 154(b) by 0 days.

(21) Appl. No.: 16/100,428

(22) Filed: Aug. 10, 2018

(65) Prior Publication Data

US 2019/0049321 A1 Feb. 14, 2019

(30) Foreign Application Priority Data

Aug. 10, 2017 (KR) .................. 10-2017-0101504

(51) Int. Cl.
*G01L 1/14* (2006.01)
*G01L 5/165* (2020.01)
(Continued)

(52) U.S. Cl.
CPC .............. *G01L 1/142* (2013.01); *G01L 5/165* (2013.01); *G06F 3/0414* (2013.01); *G01L 1/18* (2013.01);
(Continued)

(58) Field of Classification Search
CPC . G01L 1/142; G01L 1/18; G01L 5/165; G01L 5/228; G06F 3/044; G06F 3/0414; G06F 2203/04105
See application file for complete search history.

(56) References Cited

U.S. PATENT DOCUMENTS

| 7,567,681 B2 * | 7/2009 | Pelrine | ............... B64C 3/48 381/191 |
| 9,136,035 B2 * | 9/2015 | Itou | ............... H01B 1/24 |

(Continued)

FOREIGN PATENT DOCUMENTS

| KR | 10-1665191 B1 | 10/2016 |
| KR | 10-2017-0025694 A | 3/2017 |

OTHER PUBLICATIONS

Yang et al. "A flexible ionic liquid-polyurethane sponge capacitive pressure sensor", Sensors and Actuators A 285 (2019) 67-72, Nov. 2018 (Year: 2018).*

(Continued)

*Primary Examiner* — Jonathan M Dunlap
(74) *Attorney, Agent, or Firm* — Sughrue Mion, PLLC (57) ABSTRACT

A visco-poroelastic elastomer-based capacitor type tactile sensor includes a first electrode, an active layer formed on a top surface of the first electrode and made of a visco-poroelastic elastomer, a second electrode formed on a top surface of the active layer, and a controller configured to provide an electric field generated orthogonal to an extension direction of the first electrode and the second electrode between the first electrode and the second electrode. In (Continued)

proportion to an external pressure applied to the tactile sensor, a concentration of effective ions present at the interfaces between the active layer and the first and second electrodes is increased.

9 Claims, 9 Drawing Sheets

(51) Int. Cl.
*G06F 3/041* (2006.01)
*G06F 3/044* (2006.01)
*G01L 1/18* (2006.01)
*G01L 5/22* (2006.01)

(52) U.S. Cl.
CPC ............. *G01L 5/228* (2013.01); *G06F 3/044* (2013.01); *G06F 2203/04105* (2013.01)

(56) References Cited

U.S. PATENT DOCUMENTS

| 9,231,186 | B2* | 1/2016 | Busgen | F15D 1/12 |
| 9,235,265 | B2* | 1/2016 | Karamath | G06F 3/016 |
| 9,658,120 | B2* | 5/2017 | Otaka | G01L 1/146 |
| 2002/0130673 | A1* | 9/2002 | Pelrine | A63H 3/365 |
| | | | | 324/727 |
| 2010/0288635 | A1* | 11/2010 | Komiya | G01B 7/16 |
| | | | | 204/406 |
| 2015/0114814 | A1* | 4/2015 | Suzuki | H01H 13/703 |
| | | | | 200/5 A |
| 2016/0025669 | A1* | 1/2016 | Sun | H01G 9/022 |
| | | | | 205/790.5 |
| 2016/0231098 | A1* | 8/2016 | Otaka | G06F 3/044 |
| 2016/0365198 | A1* | 12/2016 | Pan | G01L 1/02 |
| 2017/0059426 | A1* | 3/2017 | Choi | G01L 5/00 |
| 2017/0059434 | A1* | 3/2017 | Li | G01L 9/0072 |
| 2017/0356815 | A1* | 12/2017 | Madden | G01L 1/146 |
| 2018/0243924 | A1* | 8/2018 | Visell | B25J 13/084 |

OTHER PUBLICATIONS

Jin et al. "An Ultrasensitive, Visco-Poroelastic Artificial Mechanotransducer Skin Inspired by Piezo2 Protein in Mammalian Merkel Cells", Adv. Mater. 2017, 29, 1605973. 2017 (Year: 2017).*
Lem et al. "Effect of Hard Segment Molecular Weight on Dilute Solution Properties of Ether Based Thermoplastic Polyurethanes", Nanoscience and Nanoengineering 1(3): 123-133, 2013 (Year: 2013).*

* cited by examiner

VISCO-POROELASTIC ELASTOMER-BASED CAPACITOR TYPE TACTILE SENSOR

CROSS-REFERENCE TO RELATED APPLICATION

This application claims the benefit under 35 USC 119(a) of Korean Patent Application No. 10-2017-0101504 filed on Aug. 10, 2017 in the Korean Intellectual Property Office, the entire disclosures of which are incorporated herein by reference for all purposes.

TECHNICAL FIELD

The present disclosure relates to a visco-poroelastic elastomer-based capacitor type tactile sensor.

BACKGROUND

In recent years, with the rapid development of electronic data devices, mobile data communication devices and mobile smart devices have rapidly propagated. Next-generation electronic systems are expected to be developed to the extent that they can be attached to or inserted into a human body beyond just being mobile. Particularly, an artificial electronic skin or a tactile sensor capable of being bent, extended and attached to the skin or body of a human or a flexure has been attracting attention.

According to a conventional pressure sensor technology, electric signal changes, such as a resistance, a capacitance, and a voltage (piezoelectric effect), of an active layer material caused by an external mechanical stimulus are converted into analog and digital signals to identify the kind and magnitude of the external mechanical stimulus. As a method for increasing the sensitivity of a sensor to a stimulus, the structure of the active layer material may be deformed to effectively recognize the external mechanical stimulus. Further, as a method for improving the mechanical properties of the device, a hybrid soft material may be used or the structure of metal and inorganic material may be controlled to be deformed by an external force. That is, such a pressure sensor recognizes a pressure as a change in electric signal caused by a change in contact area or a change in thickness during deformation of the active layer material.

However, if the pressure sensor recognizes a pressure using a change in electric signal caused by deformation of a material, a thickness change, and a contact area in response to an external mechanical stimulus in order to achieve high sensitivity, the pressure sensor shows a response only within a specific range depending on viscoelastic deformation of the material. That is, the pressure sensor recognizes a pressure only within a change in contact area and deformation of the material and thus shows a response in a narrow pressure range and is limited in application.

Further, a conventional flexible pressure sensor uses an active layer formed as continuous thin films, and, thus, it is difficult to perform patterning to a material of the active layer. As a result, there is a limitation to manufacture a high-density pressure sensor. That is, the high-density pressure sensor uses an inorganic material, and, thus, the mechanical properties of the sensor may be degraded or a process of patterning an organic material may be complicated and uneconomical.

In this regard, Korean Patent No. 10-1665191 (entitled "A multimodal tactile sensor emulating the perceptional mechanism and tissue structure of human skin") discloses a skin sensor that senses various tactile sensations by emulating the mechanism in the human tactile organ and mechanical properties of human skin.

SUMMARY

In view of the foregoing, the present disclosure provides a visco-poroelastic elastomer-based capacitor type tactile sensor capable of selectively sensing pressure and strain.

According to a first aspect of the present disclosure, a visco-poroelastic elastomer-based capacitor type tactile sensor includes a first electrode, an active layer formed on a top surface of the first electrode and made of a visco-poroelastic elastomer, a second electrode formed on a top surface of the active layer, and a controller configured to provide an electric field generated orthogonal to an extension direction of the first electrode and the second electrode between the first electrode and the second electrode. In proportion to an external pressure applied to the tactile sensor, a concentration of effective ions present at the interfaces between the active layer and the first and second electrodes is increased.

According to a second aspect of the present disclosure, a visco-poroelastic elastomer-based capacitor type tactile sensor includes a first electrode and a second electrode arranged to face each other, an active layer formed between the first electrode and the second electrode, arranged to extend in parallel with a horizontal direction of the tactile sensor, and made of a visco-poroelastic elastomer, and a controller configured to provide an electric field generated orthogonal to an extension direction of the first electrode and the second electrode between the first electrode and the second electrode. In proportion to an external strain applied to the tactile sensor, a concentration of effective ions present at the interfaces between the active layer and the first and second electrodes is increased.

According to a third aspect of the present disclosure, an array includes therein a pressure sensing tactile sensor and a strain sensing tactile sensor. The pressure sensing tactile sensor includes a first electrode, an active layer formed on a top surface of the first electrode and made of a visco-poroelastic elastomer, and a second electrode formed on a top surface of the active layer, and the strain sensing tactile sensor includes a first electrode and a second electrode arranged to face each other, and an active layer formed between the first electrode and the second electrode, arranged to extend in parallel with a horizontal direction of the tactile sensor, and made of a visco-poroelastic elastomer. Each of the first electrode and the second electrode of the pressure sensing tactile sensor and the first electrode and the second electrode of the strain sensing tactile sensor is provided with an electric field generated orthogonal to an extension direction of each electrode. In the pressure sensing tactile sensor, a concentration of effective ions present at the interfaces between the active layer and the first and second electrodes is increased in proportion to an external pressure, and in the strain sensing tactile sensor, a concentration of effective ions present at the interfaces between the active layer and the first and second electrodes is increased in proportion to an external strain.

According to the present disclosure, a visco-poroelastic elastomer-based capacitor type tactile sensor can selectively sense pressure and strain and thus can distinguish tactile information.

Further, according to the present disclosure, the capacitor type tactile sensor can sensitively respond in all pressure ranges and thus can be applied to various fields such as high-resolution artificial skin, health-monitoring system, flexible touch panel, and medical device.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

FIG. 1A and FIG. 1B are diagrams schematically illustrating the configuration and operation principle of a visco-poroelastic elastomer-based tactile sensor in accordance with various embodiments described herein, and FIG. 1A shows an active layer before application of a stimulus and FIG. 1B illustrates the visco-poroelastic elastomer-based tactile sensor at the time of application of an external stimulus.

FIG. 2A to FIG. 2C are diagrams provided to explain the mechanism of visco-poroelasticity in accordance with various embodiments described herein, and FIG. 2A shows isolated molecules within a polymer chain, FIG. 2B shows viscoelastic behavior caused by deformation of the polymer chain, and FIG. 2C shows poroelastic behavior caused by fluidity of the internal molecules isolated within the polymer chain.

FIG. 3A and FIG. 3B are conceptual diagrams illustrating the operation principle of a visco-poroelastic elastomer-based pressure sensing tactile sensor in accordance with various embodiments described herein, and FIG. 3A shows that a direction of an electric field generated orthogonal to an extension direction of a first electrode and a second electrode is the same as a direction of diffusion of effective ions upon application of an external pressure and FIG. 3B shows that the direction of the electric field is not the same as the direction of the diffusion of the effective ions upon application of an external strain.

FIG. 4A and FIG. 4B are conceptual diagrams illustrating the operation principle of a visco-poroelastic elastomer-based strain sensing tactile sensor in accordance with various embodiments described herein, and FIG. 4A shows that a direction of an electric field generated orthogonal to an extension direction of a first electrode and a second electrode is not the same as a direction of diffusion of effective ions upon application of an external pressure and FIG. 4B shows that the direction of the electric field is the same as the direction of the diffusion of the effective ions upon application of an external strain.

FIG. 6A to FIG. 6D are conceptual diagram illustrating the method of manufacturing a visco-poroelastic elastomer-based capacitor type tactile sensor in accordance with various embodiments described herein, and FIG. 6A shows a first substrate, and FIG. 6B shows a first electrode formed on the top surface of the first substrate, and FIG. 6C shows a printing process in forming an active layer, and FIG. 6D shows the active layer formed on the top surface of the first electrode.

FIG. 7A to FIG. 7C are conceptual diagrams illustrating a method of manufacturing a sensor array in which a pressure sensing tactile sensor and a strain sensing tactile sensor are arranged in accordance with various embodiments described herein, and FIG. 7A shows a pressure sensing tactile sensor and a strain sensing tactile sensor arranged into an array electrode, FIG. 7B shows an active layer formed on a surface of an electrode, and FIG. 7C shows a support configured to support a second electrode and formed on the circumference of a first substrate in the pressure sensing tactile sensor.

FIG. 8A and FIG. 8B are time-force graphs for a visco-poroelastic elastomer-based capacitor type tactile sensor in accordance with various embodiments described herein, and FIG. 8A shows that a visco-poroelastic body with viscoelastic behavior caused by chain modification and poroelastic behavior caused by ion migration shows an additional pressure change different from a conventional viscoelastic body and FIG. 8B shows a slow change in internal pressure relaxation depending on increase in area (r=2 mm, 4 mm, 6 mm) of a visco-poroelastic elastomer.

FIG. 9A to FIG. 9D are graphs showing the results of performance test of a visco-poroelastic elastomer-based capacitor type tactile sensor in accordance with various embodiments described herein, and FIG. 9A shows the sensitivity, FIG. 9B shows the pressure range, FIG. 9C shows the stability, and FIG. 9D shows the response time.

DETAILED DESCRIPTION

Hereinafter, embodiments of the present disclosure will be described in detail with reference to the accompanying drawings so that the present disclosure may be readily implemented by those skilled in the art. However, it is to be noted that the present disclosure is not limited to the embodiments but can be embodied in various other ways. In drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element. Further, it is to be understood that the term "comprises or includes" and/or "comprising or including" used in the document means that one or more other components, steps, operation and/or existence or addition of elements are not excluded in addition to the described components, steps, operation and/or elements unless context dictates otherwise.

In general, the skin of a human fingertip senses a texture and a temperature at a surface thereof at a pressure level of 10 kPa to 40 kPa with a spatial resolution of about 40 μm. Accordingly, assuming that the human fingertip has an area of about 1 cm×1 cm, the number of sensors that detect a pressure is 62,500, and the individual sensors measure the pressure in real time and transmit the measurements to the brain.

Human skin is comprised of epidermis having a thickness ranging from 0.1 mm to 0.3 mm, dermis that exits under the epidermis, and mechanoreceptors capable of sensing various physical quantities in the dermis. Herein, different kinds of receptors detect different sense. As an example, representative four receptors include a Meissner corpuscle that detects a skin movement best, a Merkel receptor that reacts to a skin-pressing sense best and charges a part of a function of recognizing a vibration, a Pacinian corpuscle that is located at the deepest position of the skin and recognizes a movement, a fine contact and a fine vibration, and a Ruffini corpuscle that is located at a deep position of the skin, has a spindle structure and detects a pressure and a temperature variation. From the viewpoint of a tactile sensor, the human skin has a structure in which active sensors (receptors, neurons) that measure individual physical quantities are embedded in a material (dermis) having viscoelastic behavior.

In the present disclosure, a Merkel cell among various mechanical receptors of the human skin is copied as an example. Hereinafter, a capacitor type tactile sensor copying the Merkel cell will be described with reference to the accompanying drawings.

Figure 1A:
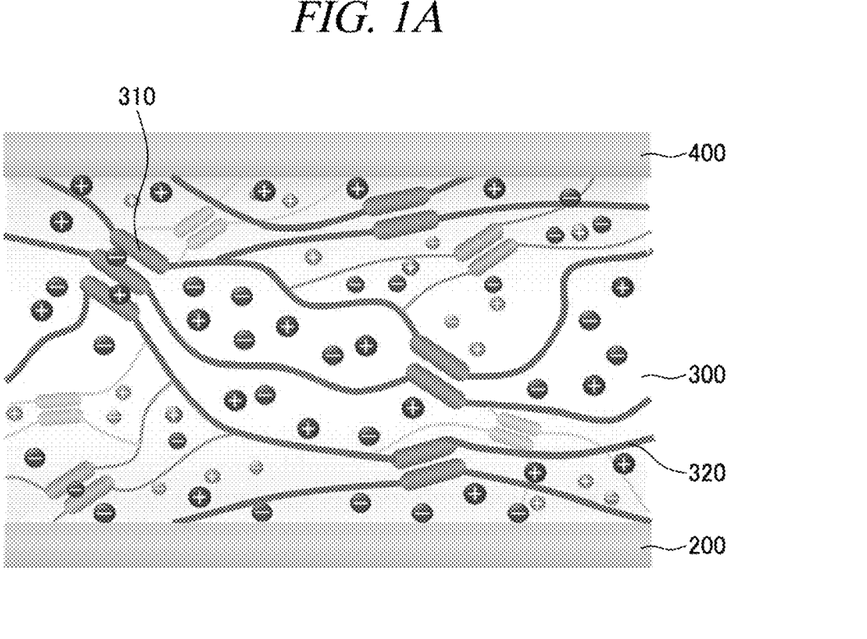
Figure 1B:
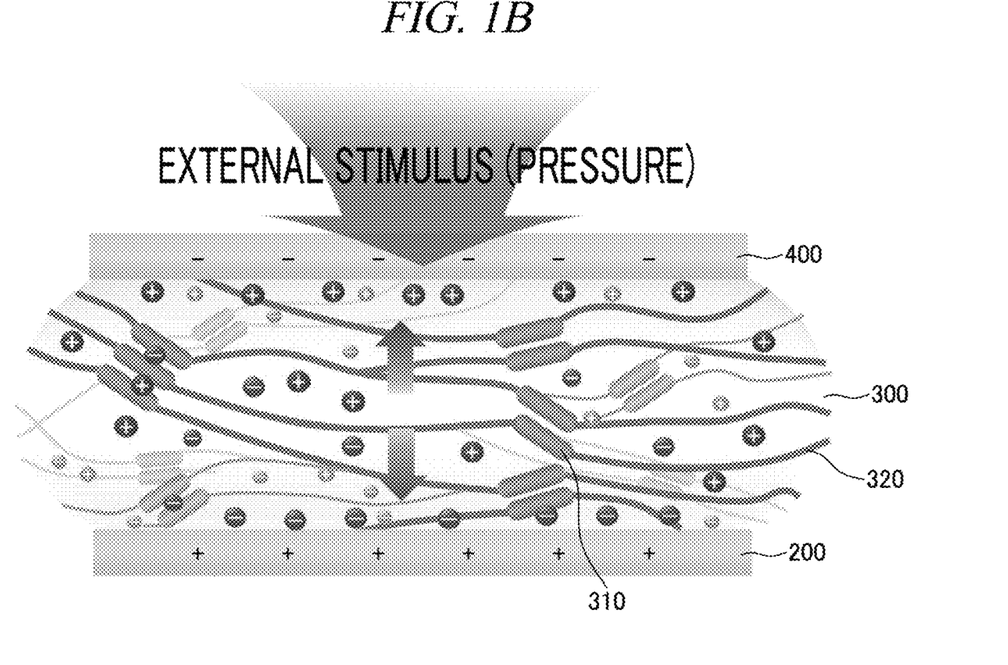

FIG. 1A and FIG. 1B are diagrams schematically illustrating the configuration and operation principle of a visco-poroelastic elastomer-based tactile sensor in accordance with an embodiment of the present disclosure.

When a Merkel cell is applied with an external stimulus, ion concentrations inside and outside the Merkel cell are changed. Particularly, when the Merkel cell is applied with a stimulus, a close channel within the Merkel cell is opened in order for ions to migrate and diffuse from the outside to the inside of the Merkel cell.

Herein, the channel is a Piezo-type mechanosensitive ion channel component 2 (Piezo2) and is activated by a physical stimulus of a cell membrane. In a sensory cell, a mechanical stimulus is converted into a receptor potential by involving this channel and a signal is transmitted to the central nervous system, and if the mechanosensitive ion channel is activated, the permeability of cations increases and membrane depolarization occurs.

FIG. 1A and FIG. 1B are conceptual diagrams illustrating a visco-poroelastic elastomer-based tactile sensor in accordance with an embodiment of the present disclosure. The visco-poroelastic elastomer-based tactile sensor includes a second electrode 400 and a first electrode 200 on the top and the bottom, respectively, and an ionic elastomer in the middle as an active layer 300. The active layer 300 of the capacitor type tactile sensor according to an embodiment of the present disclosure may have a rectangular shape as illustrated in FIG. 1A and FIG. 1B and may also have a hemispheric shape.

Depending on a user's purpose, the active layer 300 and the second electrode 400 may be in contact with each other from the beginning, or may be spaced apart from each other at a preset distance without being in contact with each other.

FIG. 1A shows the active layer 300 before application of a stimulus. The second electrode 400 on the active layer 300 is negatively charged. The active layer 300 in the middle includes cations, anions, hard segments 310, and soft segments 320. The segments partition the inside of the active layer 300 and isolate the ions.

Herein, the active layer 300 is formed using a matrix (IL/TPU) solution of thermoplastic polyurethane and an ionic liquid. In general, polyurethane is a segmented block copolymer composed of the hard segments 310 as rigid molecular chains and the soft segments 320 having a flexible structure. In the segments 310 and 320, phase separation is caused by thermodynamic incompatibility thereof.

For reference, the ionic liquid is a salt that exists in the form of a liquid at room temperature. Since the ionic liquid itself is composed of ions only, it has a high electric conductivity of about 10 mS/cm, a wide electrochemical window of 4V or more and very low volatility. The viscosity of the ionic liquid is similar to that of water. Meanwhile, TPU is transparent and elastic, and blends well with the ionic liquid.

The following Example 1 shows an example of a matrix (TPU) solution of an ionic liquid.

Example 1

The following Example 2 shows an example of a cation (EMIM+) contained in an ionic liquid and an example of an anion (TFSI-) contained in an ionic liquid.

Example 2

The hard segments 310 have a glass transition temperature (Tg) higher than room temperature. Thus, physical bridging points are formed between the hard segments 310 having glassy property through crystallization, hydrogen bonding, or bonding by a Van der Waals force. Meanwhile, the soft segments 320 have a glass temperature lower than room temperature. Thus, the soft segments 320 having rubbery property function to add important properties required for an elastic body, i.e., high elongation, high elasticity, high elastic recovery rate, and the like. If an external force is applied to these segments 310 and 320, not only the orientation of the segments 310 and 320 but also the structures thereof may be changed.

FIG. 1B illustrates the visco-poroelastic elastomer-based tactile sensor at the time of application of an external stimulus. When a pressure is applied toward the active layer 300 from the second electrode 400 on the active layer 300, the active layer 300 made of a flexible ionic elastomer is deformed by the external pressure. Further, the active layer 300 may be deformed by a pressure applied when it is brought into contact with the second electrode 400. Herein, positive charges within the active layer 300 move to the vicinity of the second electrode 400 which is negatively charged. Further, as the shapes of the segments 310 and 320 which partition the inside of the active layer 300 are changed, the ions isolated within the segments 310 and 320 are released out. It can be seen that this phenomenon is similar to an ion exchange principle where the Piezo2 channel is opened when the Merkel cell receives a stimulus and ions are squeezed into the channel.

Figure 2A:
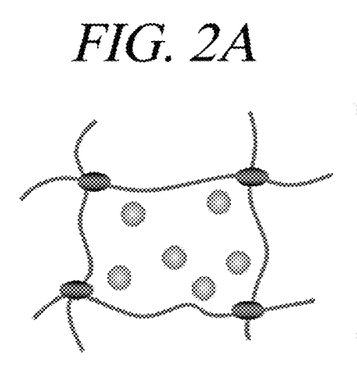
Figure 2B:
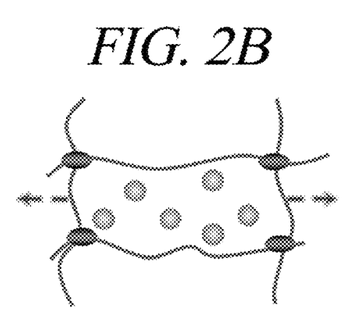
Figure 2C:
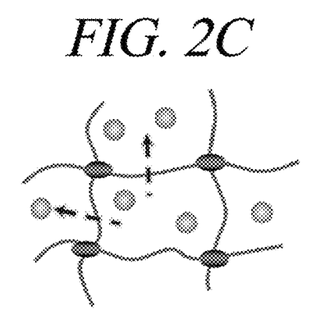

FIG. 2A to FIG. 2C are diagrams provided to explain the mechanism of visco-poroelasticity in accordance with an embodiment of the present disclosure.

FIG. 2A shows isolated molecules within a polymer chain. FIG. 2B shows viscoelastic behavior caused by deformation of the polymer chain, and FIG. 2C shows poroelastic behavior caused by fluidity of the internal molecules isolated within the polymer chain.

That is, the ionic elastomer has mechanical properties including viscoelastic behavior caused by deformation of a polymer chain upon application of an external stimulus and poroelastic behavior caused by fluidity of ions.

Herein, the viscoelastic behavior caused by deformation of a polymer chain means that the shapes of the segments 310 and 320 which partition the inside of the active layer 300 are changed by an external pressure. The poroelastic behavior caused by fluidity of ions means that as the shapes of the segments 310 and 320 are changed, the ions isolated within the segments 310 and 320 are released out.

Figure 3A:
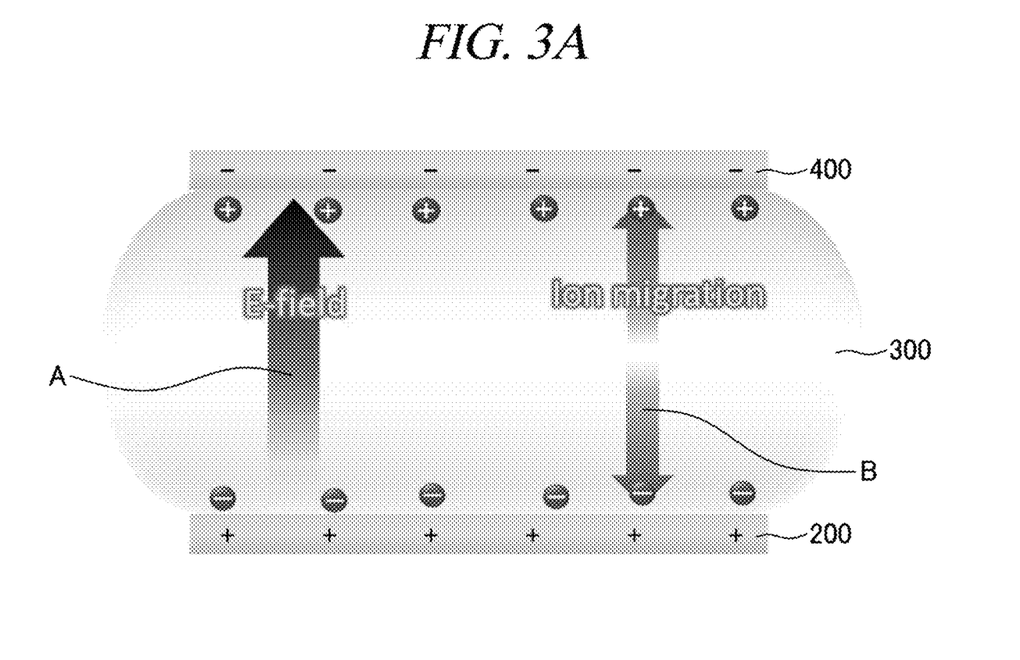
Figure 3B:
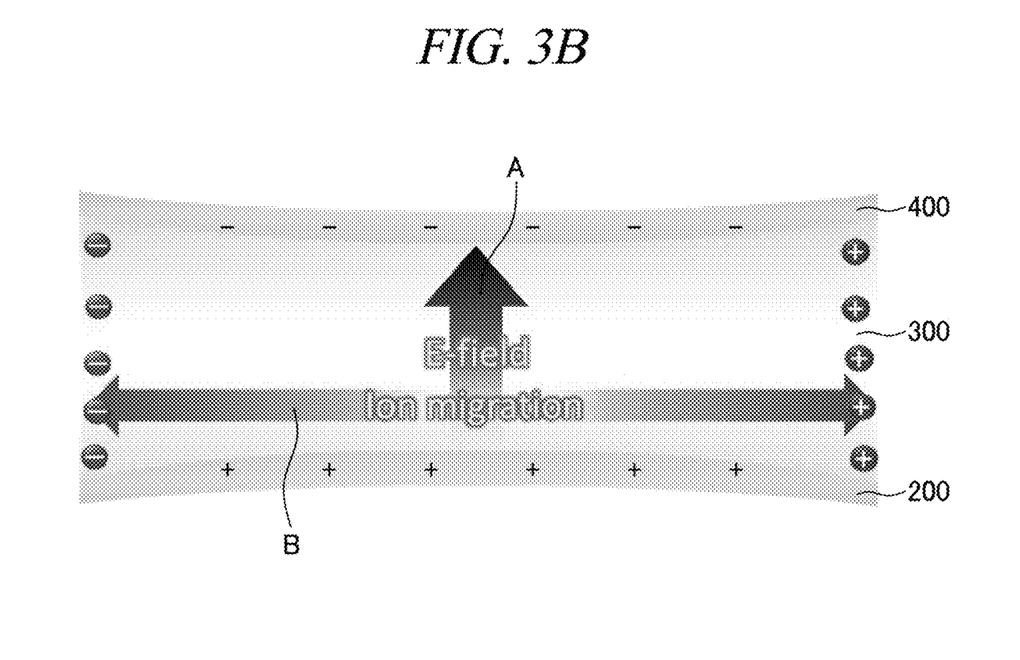

FIG. 3A and FIG. 3B are conceptual diagrams illustrating the operation principle of a visco-poroelastic elastomer-based pressure sensing tactile sensor in accordance with an embodiment of the present disclosure.

Figure 4A:
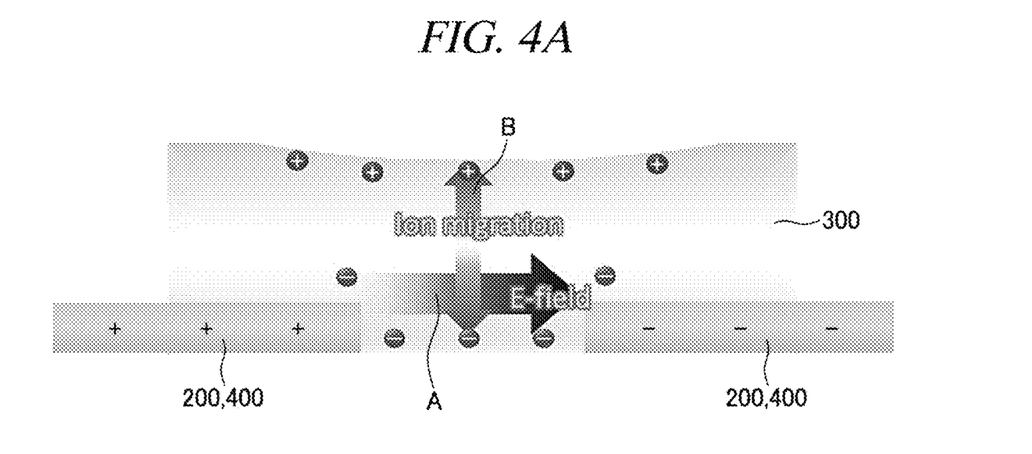
Figure 4B:
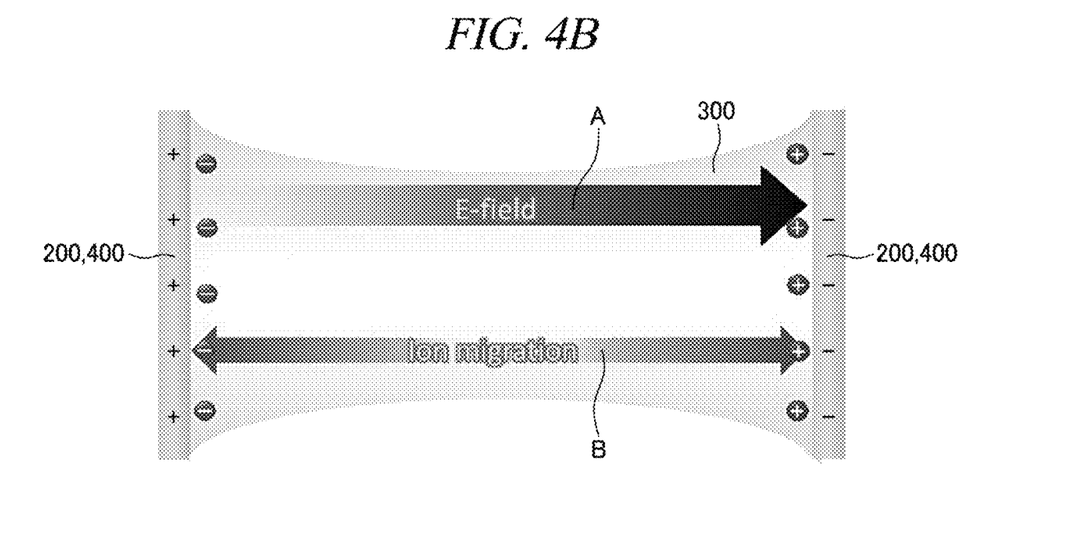

FIG. 4A and FIG. 4B are conceptual diagrams illustrating the operation principle of a visco-poroelastic elastomer-based strain sensing tactile sensor in accordance with another embodiment of the present disclosure.

As illustrated in FIG. 1A and FIG. 1B, the active layer 300 includes therein the segments 310 and 320 which partition the inside of the active layer 300 and isolate ions at a predetermined concentration, and as the shapes of the segments 310 and 320 in the active layer 300 applied with an external pressure/strain are change, the ions isolated within the segments 310 and 320 are released out, and ion polarization occurs between the first electrode 200 and the second electrode 400 due to an electric field generated orthogonal to an extension direction of the first electrode 200 and the second electrode 400 and a concentration of effective ions on a surface of the active layer 300 is adjusted. That is, the segments 310 and 320 partition the inside of the active layer 300 and confine a predetermined concentration of ions therein.

Since the active layer 300 is made of an ionic elastomer formed of an elastomer and an ionic liquid and has elasticity, it is contracted/stretched as illustrated in FIG. 3A, FIG. 3B, FIG. 4A, and FIG. 4B when a pressure/strain is applied thereto. As such, when the active layer 300 is contracted/stretched by the external pressure/strain, the shapes of the segments 310 and 320 within the active layer 300 are changed and the ions confined in the segments 310 and 320 are released out of the segments 310 and 320 into the active layer 300. Therefore, a concentration of effective ions contributing to a capacitance value within the active layer 300 is increased.

Referring to FIG. 3A and FIG. 3B, a visco-poroelastic elastomer-based capacitor type tactile sensor includes, the first electrode 200, the active layer 300 formed on a top surface of the first electrode 200 and made of a visco-poroelastic elastomer, the second electrode formed on a top surface of the active layer 300, and a controller (not illustrated) configured to provide an electric field A generated orthogonal to the extension direction of the first electrode 200 and the second electrode 400 between the first electrode 200 and the second electrode 400. Herein, in proportion to an external pressure applied to the tactile sensor, a concentration of effective ions present in the active layer 300 is increased.

Further, referring to FIG. 1A, FIG. 1B, FIG. 3A, and FIG. 3B, the active layer 300 is formed including an elastomer with viscoelastic behavior and an ionic liquid with poroelastic behavior caused by fluidity, and includes therein the segments 310 and 320 which partition the inside of the active layer 300 and isolate ions at a predetermined concentration, and a concentration of effective ions on the surface of the active layer 300 applied with pressure is adjusted by an external pressure.

When the partitioned areas are deformed by the external pressure, ions isolated by the segments 310 and 320 are released out into the active layer 300, and the released ions cause an increase in capacitance value. Further, a concentration of effective ions is adjusted by the external pressure, and a capacitance value of the tactile sensor is adjusted accordingly.

FIG. 3A shows that a direction of the electric field A generated orthogonal to the extension direction of the first electrode 200 and the second electrode 400 is the same as a direction of diffusion B of effective ions upon application of an external pressure. FIG. 3B shows that the direction of the electric field A is not the same as a direction of the diffusion B of the effective ions upon application of an external strain. That is, as illustrated in FIG. 3A, in the pressure sensing tactile sensor, the pressure and the electric field A are orthogonal to the extension direction of the electrodes 200 and 400, and, thus, the pressure sensing tactile sensor has sensitivity to pressure.

For example, referring to FIG. 3A, the pressure sensing tactile sensor generates an electric field by applying a predetermined voltage between the first electrode 200 and the second electrode 400, and, thus, anions are concentrated on a surface of the first electrode 200 applied with a positive voltage and cations are concentrated on a surface of the second electrode 400 applied with a negative voltage. As a result, an electrical double layer is formed. Herein, in proportion to a pressure applied from the outside, ions concentrated on the surfaces of the respective electrodes 200 and 400 are increased. The pressure sensing tactile sensor can more precisely sense the intensity of pressure by sensing a variation in ions.

Referring to FIG. 4A and FIG. 4B, a visco-poroelastic elastomer-based capacitor type tactile sensor includes the first electrode 200 and the second electrode 400 arranged to face each other, the active layer 300 formed between the first electrode 200 and the second electrode 400, arranged to extend in parallel with a horizontal direction of the tactile sensor, and made of a visco-poroelastic elastomer, and a controller (not illustrated) configured to provide the electric field A generated orthogonal to the extension direction of the first electrode 200 and the second electrode 400 between the first electrode 200 and the second electrode 400. Herein, in proportion to an external strain applied to the tactile sensor, a concentration of effective ions present at the interfaces between the active layer 300 and the first and second electrodes 200 and 400 is increased.

Referring to FIG. 1A, FIG. 1B, FIG. 4A, and FIG. 4B, the active layer 300 is formed including an elastomer with viscoelastic behavior and an ionic liquid with poroelastic behavior caused by fluidity, and includes therein the segments 310 and 320 which partition the inside of the active layer 300 and isolate ions at a predetermined concentration, and a concentration of effective ions on the surface of the active layer 300 applied with strain is adjusted by an external strain.

When the partitioned areas are deformed by the external strain, ions isolated by the segments 310 and 320 are released out into the active layer 300, and the released ions cause an increase in capacitance value. Further, a concentration of effective ions is adjusted by the external strain, and a capacitance value of the tactile sensor is adjusted accordingly.

FIG. 4B shows that a direction of the electric field A generated orthogonal to the extension direction of the first electrode 200 and the second electrode 400 is the same as a direction of the diffusion B of the effective ions upon application of an external strain. Meanwhile, FIG. 4A shows that the direction of the electric field A is not the same as the direction of the diffusion B of effective ions upon application of an external pressure. That is, as illustrated in FIG. 4B, in the strain sensing tactile sensor, the strain and the electric field A are orthogonal to the extension direction of the electrodes 200 and 400, and, thus, the strain sensing tactile sensor has sensitivity to strain.

For example, referring to FIG. 4B, the strain sensing tactile sensor generates an electric field by applying a predetermined voltage between the first electrode 200 and the second electrode 400, and, thus, anions are concentrated on the surface of the first electrode 200 applied with a positive voltage and cations are concentrated on the surface of the second electrode 400 applied with a negative voltage. As a result, an electrical double layer is formed. Herein, in proportion to a strain applied from the outside, ions concentrated on the surfaces of the respective electrodes 200 and 400 are increased. The strain sensing tactile sensor can more precisely sense the intensity of strain by sensing a variation in ions.

That is, the visco-poroelastic elastomer-based tactile sensor of the present disclosure induces a change in electric capacitance by formation of an additional electrical double layer using the above-described visco-poroelastic ion diffusion mechanism. That is, in addition to a change in thickness of an elastic dielectric material caused by pressure/strain, a continuous change in electric signal is induced by ion migration, and, thus, the visco-poroelastic elastomer-based tactile sensor can respond in a wide pressure/strain range.

Further, it is possible to distinguish and analyze an external pressure/strain applied to the tactile sensor and solve a complicated signal processing problem.

Hereinafter, a configuration of a sensor array in which a pressure sensing tactile sensor and a strain sensing tactile sensor are arranged according to another aspect of the present disclosure and a method of manufacturing the sensor array will be described. Explanation of the same components as those described above will not be provided.

Figure 5:
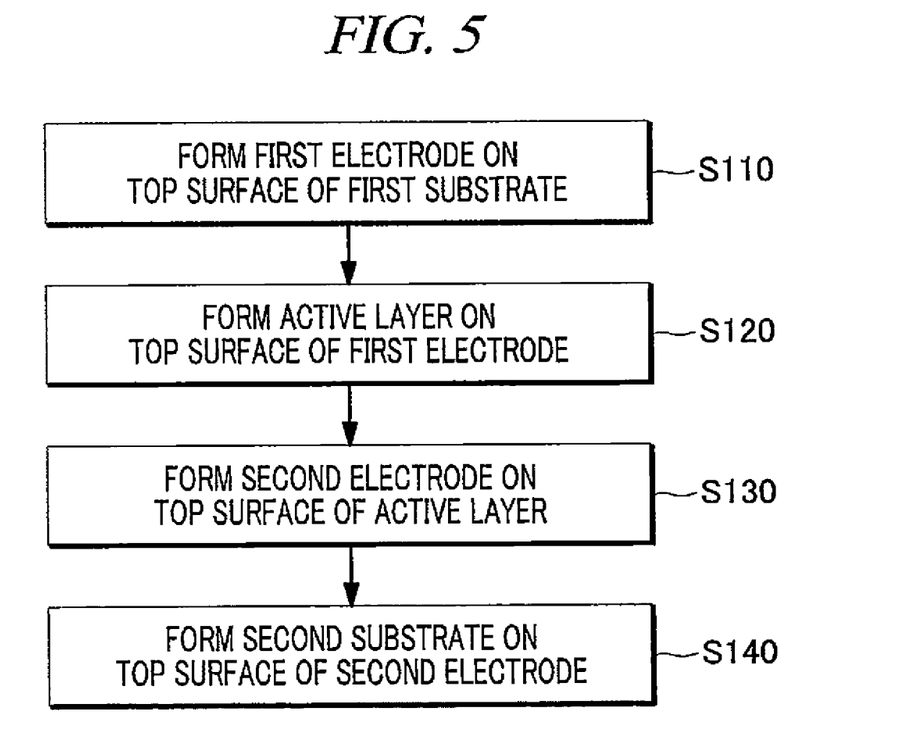
FIG. 5 is a flowchart provided to explain a method of manufacturing a visco-poroelastic elastomer-based capacitor type tactile sensor in accordance with various embodiments described herein.

FIG. 5 is a flowchart provided to explain a method of manufacturing a visco-poroelastic elastomer-based capacitor type tactile sensor in accordance with an embodiment of the present disclosure.

FIG. 6A to FIG. 6D are a conceptual diagram illustrating the method of manufacturing a visco-poroelastic elastomer-based capacitor type tactile sensor in accordance with an embodiment of the present disclosure.

Figure 7A:
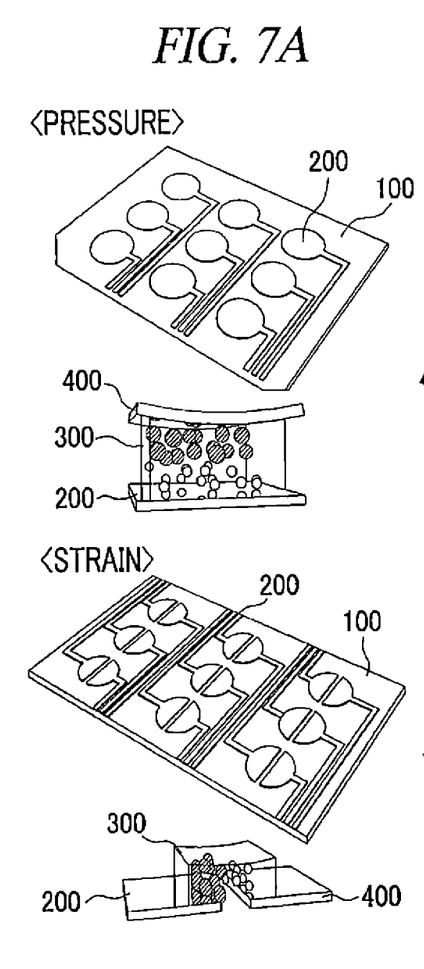
Figure 7B:
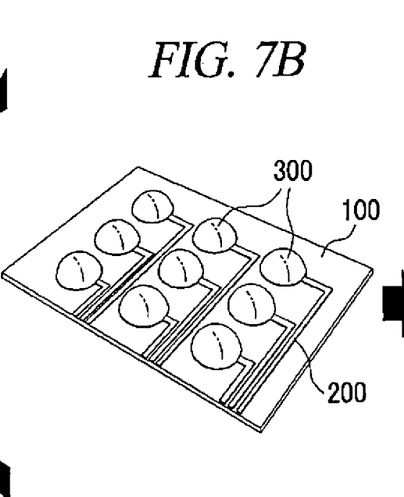
Figure 7C:
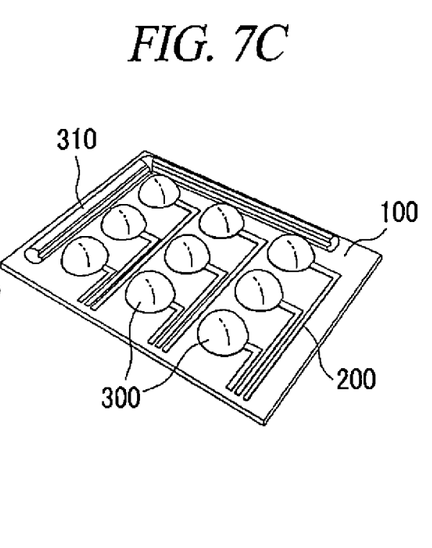

FIG. 7A to FIG. 7C are conceptual diagrams illustrating a method of manufacturing a sensor array in which a pressure sensing tactile sensor and a strain sensing tactile sensor are arranged in accordance with an embodiment of the present disclosure.

Referring to FIG. 7A to FIG. 7C, in an array including therein a pressure sensing tactile sensor and a strain sensing tactile sensor, the pressure sensing tactile sensor includes the first electrode 200, the active layer 300 formed on the top surface of the first electrode 200 and made of a visco-poroelastic elastomer, and the second electrode 400 formed on the top surface of the active layer 300, and the strain sensing tactile sensor includes the first electrode 200 and the second electrode 400 arranged to face each other, and the active layer 300 formed between the first electrode 200 and the second electrode 400, arranged to extend in parallel with a horizontal direction of the tactile sensor, and made of a visco-poroelastic elastomer. Each of the first electrode 200 and the second electrode 400 of the pressure sensing tactile sensor and the first electrode 200 and the second electrode 400 of the strain sensing tactile sensor is provided with an electric field generated orthogonal to an extension direction of each electrode. In the pressure sensing tactile sensor, a concentration of effective ions present at the interfaces between the active layer 300 and the first and second electrodes 200 and 400 is increased in proportion to an external pressure, and in the strain sensing tactile sensor, a concentration of effective ions present at the interfaces between the active layer 300 and the first and second electrodes 200 and 400 is increased in proportion to an external strain.

Hereinafter, a method of manufacturing a visco-poroelastic elastomer-based capacitor type tactile sensor in accordance with an embodiment of the present disclosure will be described with reference to FIG. 5 to FIG. 6D.

Figure 6A:
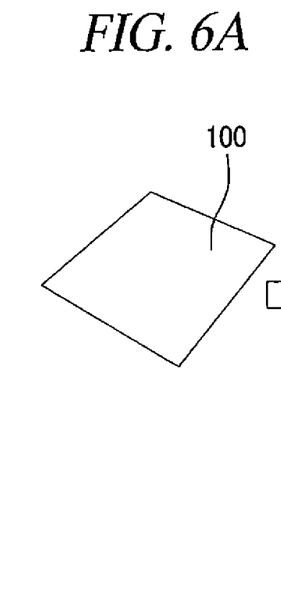
Figure 6B:
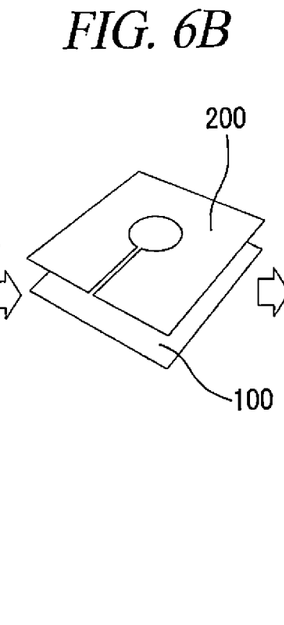
Figure 6C:
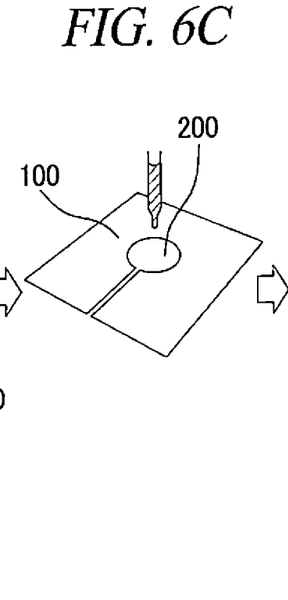
Figure 6D:
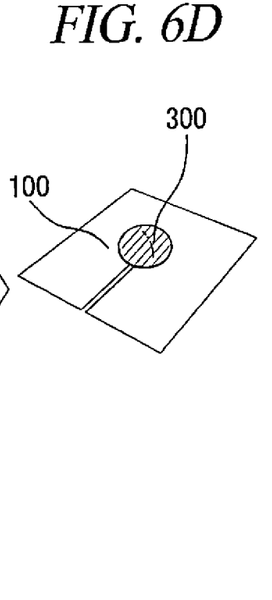

Referring to FIG. 5 to FIG. 6D, the method of manufacturing a visco-poroelastic elastomer-based capacitor type tactile sensor includes: forming the first electrode 200 on a top surface of a first substrate 100 (S110), forming the active layer 300 on the top surface of the first electrode 200 (S120), forming the second electrode 400 on the top surface of the active layer 300 (S130), and arranging a second substrate 500 on a top surface of the second electrode 400 (S140).

In some cases where the active layer 300 and the second electrode 400 are arranged not to in contact with each other, the process is performed as described above until S120 and then the second electrode 400 and the second substrate 500 may be formed separately.

For reference, the first substrate 100 and the second substrate 500 are components located at the lowermost layer of the capacitor type tactile sensor and may be made of any one of glass, ceramic, silicon, rubber or plastic, but may not be limited thereto. Here, the thicknesses, sizes and shapes of the first and second substrates 100 and 500 may be set in various ways, and, when necessary, the first and second substrates 100 and 500 may be omitted. The first substrate 100 and the second substrate 500 are in contact with the first electrode 200 and the second electrode 400 to support the first electrode 200 and the second electrode 400, respectively.

For example, as illustrated in FIG. 6A and FIG. 6B, when the first electrode 200 is formed in S110, the selective electrode 200 may be formed on the top surface of the first substrate 100.

A photolithography process which is generally performed to form a channel shape in a semiconductor process may be used. For example, in order to form a channel into a desired shape, a specific portion is exposed to light using a mask and then a pattern is formed. Then, the desired shape can be obtained by performing a dry or wet etching process.

Further, the channel may be formed by any one deposition method of thermal evaporation, e-beam evaporation, and sputtering, but may not be limited thereto. Furthermore, a solution process such as spray coating, spin coating, and vacuum filtration is possible as for an organic material.

The material forming the first electrode 200 may be an electrode material selected from metal, conductive metal oxide, conductive polymer, conductive carbon, conductive nanoparticle and a nanoparticle inserted between organic materials or conductive materials. Likewise, the second electrode 400 can also be prepared by the same way as described above.

As illustrated in FIG. 6C and FIG. 6D, when the active layer 300 is formed on the top surface of the first electrode 200 in S120, an ionic elastomer having a micro-lens shape may be formed through a printing process.

A method of manufacturing a sensor array in which a pressure sensing tactile sensor and a strain sensing tactile sensor are arranged will be described with reference to FIG. 7A to FIG. 7C.

For example, referring to FIG. 7A, in the pressure sensing tactile sensor, the first electrode 200 may be configured as a unit formed into an array. Then, in S140, the second electrode 400 can also be prepared by the same way as described above.

For another example, in the strain sensing tactile sensor, the first electrode 200 and the second electrode 400 arranged to face each other may be configured as a unit formed into an array. That is, S110 and S140 can be performed simultaneously.

Then, as illustrated in FIG. 7B, in S120, the active layer 300 may be formed to extend in parallel with the top surface of the first electrode 200 or the horizontal direction of the tactile sensor. Herein, the active layer 300 made of a visco-poroelastic elastomer can be formed more effectively by a direct printing process to the surfaces of the substrate 100 and the electrode 200 than by a conventional spin coating and pouring process.

Then, as illustrated in FIG. 7C, in the pressure sensing tactile sensor, a support 301 configured to support the second electrode 400 may be further formed on the circumference of the first substrate 100 before S130 in which the second electrode 400 is formed.

Figure 8A:
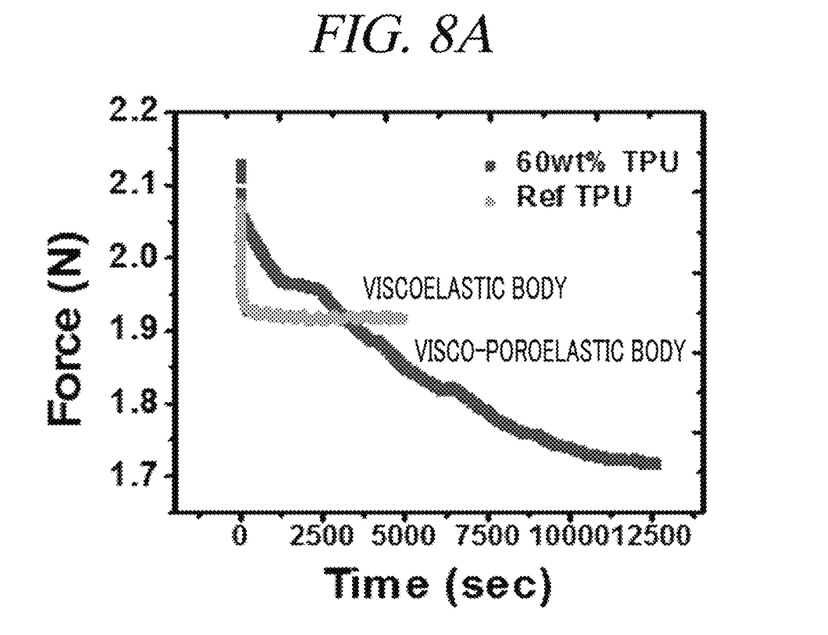
Figure 8B:
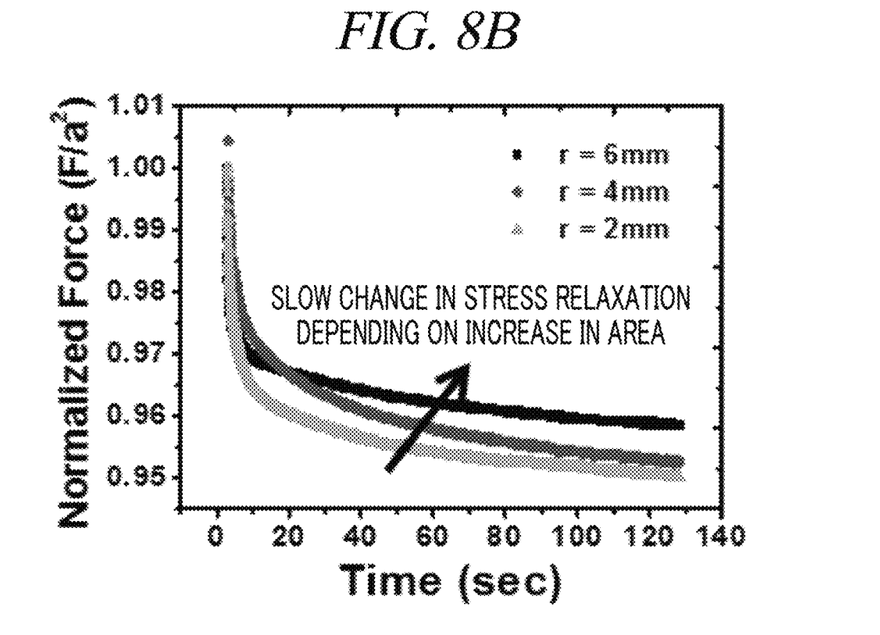

FIG. 8A and FIG. 8B are time-force graphs for a visco-poroelastic elastomer-based capacitor type tactile sensor in accordance with.

FIG. 8A and FIG. 8B show the result of checking a time-dependent force change of a visco-poroelastic elastomer-based capacitor type tactile sensor. FIG. 8A confirms that a visco-poroelastic body with viscoelastic behavior caused by chain modification and poroelastic behavior caused by ion migration shows an additional pressure change different from a conventional viscoelastic body. Further, FIG. 8B confirms that the visco-poroelastic elastomer has a different behavior from a viscoelastic body, through a slow change in internal pressure relaxation depending on increase in area (r=2 mm, 4 mm, 6 mm) of the visco-poroelastic elastomer, and, thus, the behavior of the visco-poroelastic elastomer was identified.

FIG. 9A to FIG. 9D are graphs showing the results of performance test of a visco-poroelastic elastomer-based capacitor type tactile sensor in accordance with an embodiment of the present disclosure.

A visco-poroelastic elastomer having a micro-lens shape was formed on a flexible substrate and an electrode (highly conductive polymer (PEDOT:PSS), silver nanowire (Ag-NWs)) through a printing process according to an embodiment of the present disclosure, and the shape and size was controlled by regulating process parameters. Then, a tactile sensor including an active layer made of the prepared visco-poroelastic elastomer having a micro-lens shape was manufactured and the characteristics of the sensor was checked.

Figure 9A:
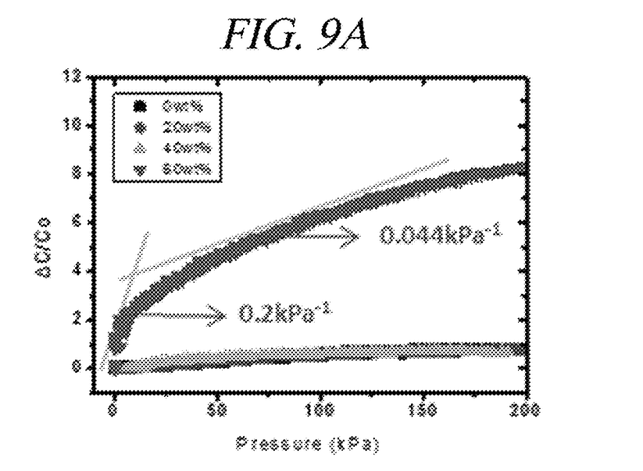
Figure 9B:
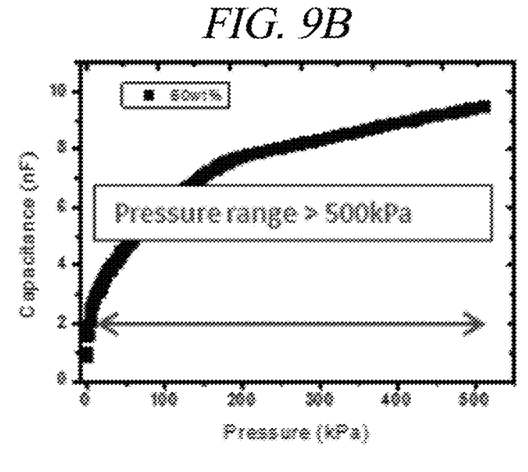

FIG. 9A and FIG. 9B show the sensitivity and the pressure range of the visco-poroelastic elastomer-based tactile sensor according to an embodiment of the present disclosure. Referring to FIG. 9A, the active layer 60 wt % had a great change in capacitance depending on pressure and the other active layers 0 wt %, 20 wt %, and 40 wt % had little change in capacitance depending on pressure. Referring to FIG. 9B, the active layer 60 wt % had a change in capacitance within a pressure range of from 100 kPa to 500 kPa.

Figure 9C:
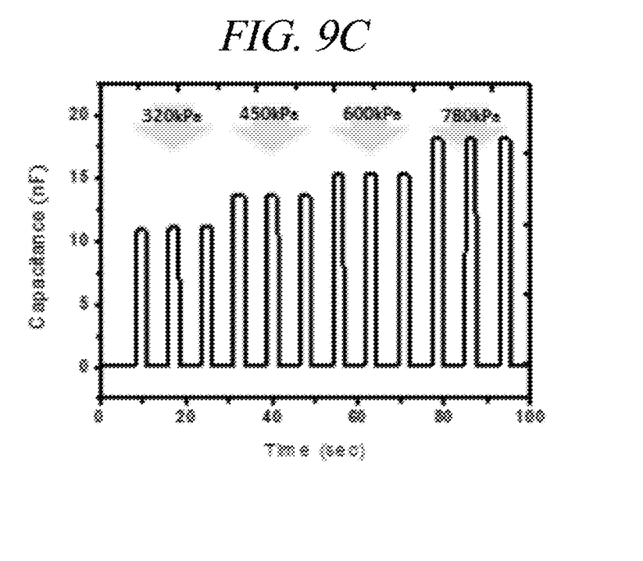
Figure 9D:
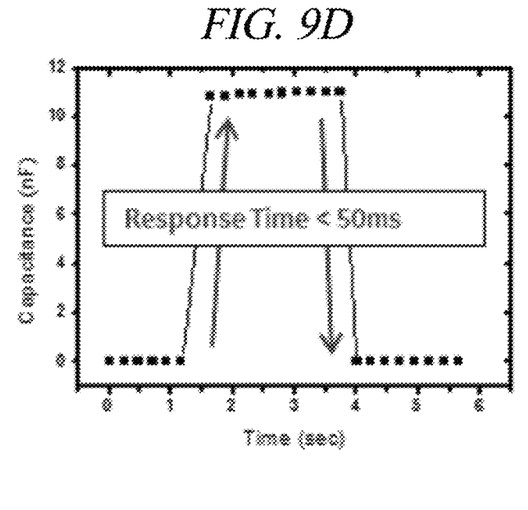

FIG. 9C and FIG. 9D show the stability and the response time of the visco-poroelastic elastomer-based capacitor type tactile sensor according to an embodiment of the present disclosure. FIG. 9C confirms that a capacitance value was uniformly changed when a different external pressure (320 kPa, 450 kPa, 600 kPa, 780 kPa) was applied for each period (at 20-second intervals) within 100 seconds. FIG. 9D shows a response time of 50 ms, and it can be seen that even when a force is applied repeatedly, the stability of the visco-poroelastic elastomer-based capacitor type tactile sensor according to an embodiment of the present disclosure can be secured.

Therefore, it is confirmed from the graphs in FIG. 9A to FIG. 9D that the visco-poroelastic elastomer-based capacitor type tactile sensor according to an embodiment of the present disclosure has excellent sensitivity, pressure range, stability, and response time. Also, the applicability to its application fields was conformed.

The above description of the present disclosure is provided for the purpose of illustration, and it would be understood by a person with ordinary skill in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

EXPLANATION OF REFERENCE NUMERALS

100: First substrate
200: First electrode
300: Active layer
400: Second electrode
500: Second substrate

We claim:
1. A visco-poroelastic elastomer-based capacitor type tactile sensor, comprising:
   a first electrode;
   an active layer formed on a top surface of the first electrode and made of a visco-poroelastic elastomer;
   a second electrode formed on a top surface of the active layer; and
   a controller configured to provide an electric field generated orthogonal to an extension direction of the first electrode and the second electrode between the first electrode and the second electrode,
   wherein in proportion to an external pressure applied to the tactile sensor, a concentration of effective ions present at the interfaces between the active layer and the first and second electrodes is increased; and wherein when the visco-poroelastic elastomer-based capacitor type tactile sensor is a pressure sensing tactile sensor, a direction of the electric field and a direction of diffusion of the effective ions upon an application of external pressure are orthogonal to the extension direction of the first electrode and the second electrode.

2. The visco-poroelastic elastomer-based capacitor type tactile sensor of claim 1, wherein the active layer is formed including an elastomer with viscoelastic behavior and an ionic liquid with poroelastic behavior caused by fluidity and includes therein segments which partition the inside of the active layer and isolate ions at a predetermined concentration, and a concentration of effective ions on the surface of the active layer applied with pressure is adjusted by an external pressure.

3. The visco-poroelastic elastomer-based capacitor type tactile sensor of claim 2, wherein when the partitioned areas are deformed by the external pressure, the segments release out the isolated ions into the active layer and the released ions cause an increase in capacitance value.

4. The visco-poroelastic elastomer-based capacitor type tactile sensor of claim 1, wherein the concentration of the effective ions is adjusted by a magnitude of the external pressure, and a capacitance value of the tactile sensor is adjusted accordingly.

5. A visco-poroelastic elastomer-based capacitor type tactile sensor, comprising:
    a first electrode and a second electrode arranged to face each other;
    an active layer formed between the first electrode and the second electrode, arranged to extend in parallel with a horizontal direction of the tactile sensor, and made of a visco-poroelastic elastomer; and
    a controller configured to provide an electric field generated orthogonal to an extension direction of the first electrode and the second electrode between the first electrode and the second electrode,
    wherein in proportion to an external strain applied to the tactile sensor, a concentration of effective ions present at the interfaces between the active layer and the first and second electrodes is increased; and
    wherein when the visco-poroelastic elastomer-based capacitor type tactile sensor is a strain sensing tactile sensor, a direction of the electric field and a direction of diffusion of the effective ions upon an application of external strain are orthogonal to the extension direction of the first electrode and the second electrode.

6. The visco-poroelastic elastomer-based capacitor type tactile sensor of claim 5, wherein the active layer is formed including an elastomer with viscoelastic behavior and an ionic liquid with poroelastic behavior caused by fluidity and includes therein segments which partition the inside of the active layer and isolate ions at a predetermined concentration, and a concentration of effective ions on the surface of the active layer applied with strain is adjusted by an external strain.

7. The visco-poroelastic elastomer-based capacitor type tactile sensor of claim 6, wherein when the partitioned areas are deformed by the external strain, the segments release out the isolated ions into the active layer and the released ions cause an increase in capacitance value.

8. The visco-poroelastic elastomer-based capacitor type tactile sensor of claim 5, wherein the concentration of the effective ions is adjusted by a magnitude of the external strain, and a capacitance value of the tactile sensor is adjusted accordingly.

9. An array in which a pressure sensing tactile sensor and a strain sensing tactile sensor are arranged,
    wherein the pressure sensing tactile sensor includes:
        a first electrode;
        an active layer formed on a top surface of the first electrode and made of a visco-poroelastic elastomer; and
        a second electrode formed on a top surface of the active layer, and
    wherein the strain sensing tactile sensor includes:
        a first electrode and a second electrode arranged to face each other; and
        an active layer formed between the first electrode and the second electrode, arranged to extend in parallel with a horizontal direction of the tactile sensor, and made of a visco-poroelastic elastomer, and
    wherein each of the first electrode and the second electrode of the pressure sensing tactile sensor and the first electrode and the second electrode of the strain sensing tactile sensor is provided with an electric field generated orthogonal to an extension direction of each electrode,
    wherein in the pressure sensing tactile sensor, a concentration of effective ions present at the interfaces between the active layer and the first and second electrodes is increased in proportion to an external pressure, and
    wherein in the strain sensing tactile sensor, a concentration of effective ions present at the interfaces between the active layer and the first and second electrodes is increased in proportion to an external strain.

* * * * *